(12) United States Patent
Borschert

(10) Patent No.: US 9,248,511 B2
(45) Date of Patent: Feb. 2, 2016

(54) DRILLING TOOL AND METHOD FOR DRILLING

(75) Inventor: Bernhard Walter Borschert, Bamberg (DE)

(73) Assignee: KENNAMETAL INC., Latrobe, PA (US)

( * ) Notice: Subject to any disclaimer, the term of this patent is extended or adjusted under 35 U.S.C. 154(b) by 1021 days.

(21) Appl. No.: 12/597,970

(22) PCT Filed: Apr. 19, 2008

(86) PCT No.: PCT/EP2008/003171
§ 371 (c)(1),
(2), (4) Date: Feb. 3, 2010

(87) PCT Pub. No.: WO2008/141709
PCT Pub. Date: Nov. 27, 2008

(65) Prior Publication Data
US 2010/0221078 A1     Sep. 2, 2010

(30) Foreign Application Priority Data
May 24, 2007   (DE) .......................... 10 2007 024 184

(51) Int. Cl.
| | |
|---|---|
| *B23B 35/00* | (2006.01) |
| *B23B 51/02* | (2006.01) |
| *B23B 47/28* | (2006.01) |
| *B23B 51/00* | (2006.01) |

(52) U.S. Cl.
CPC .............. *B23B 51/02* (2013.01); *B23B 51/009* (2013.01); *B23B 2251/04* (2013.01); *B23B 2251/14* (2013.01); *B23B 2251/287* (2013.01); *B23B 2265/12* (2013.01); *Y10T 408/03* (2015.01); *Y10T 408/906* (2015.01); *Y10T 408/9095* (2015.01)

(58) Field of Classification Search
USPC ......... 408/1 R, 223, 224, 227, 704, 705, 230, 408/229, 211, 225
See application file for complete search history.

(56) References Cited

U.S. PATENT DOCUMENTS

| | | | | |
|---|---|---|---|---|
| 2,396,335 | A * | 3/1946 | Moller | 408/230 |
| 2,576,664 | A * | 11/1951 | Berlien | 408/230 |
| 4,189,266 | A | 2/1980 | Koslow | |
| 4,190,386 | A * | 2/1980 | Brabetz et al. | 408/1 R |
| 4,231,692 | A * | 11/1980 | Brabetz et al. | 408/230 |
| 4,568,229 | A | 2/1986 | Hulsey | |
| 4,943,236 | A | 7/1990 | Linkow et al. | |
| 5,078,554 | A * | 1/1992 | Kubota | 408/230 |
| 5,569,035 | A * | 10/1996 | Balfour et al. | 433/165 |
| 5,685,674 | A * | 11/1997 | Tåquist et al. | 409/132 |
| 5,758,997 | A * | 6/1998 | Mealey et al. | 408/224 |

(Continued)

FOREIGN PATENT DOCUMENTS

| | | |
|---|---|---|
| DE | 2655452 A1 | 6/1978 |
| DE | 3318204 A1 | 3/1984 |

(Continued)

*Primary Examiner* — Essama Omgba
(74) *Attorney, Agent, or Firm* — Larry R. Meenan

(57) ABSTRACT

A drilling tool extends in a longitudinal direction and has a drill point and first and second major cutting edges, which extend approximately radially outward. The drill point is arranged eccentrically relative to a central axis, which is the same as the axis of rotation. The second major cutting edge is arranged by a cutting-height difference higher than the first major cutting edge. The first major cutting edge has a shorter radial edge length than the second major cutting edge. A method of utilizing the tool is also disclosed.

9 Claims, 1 Drawing Sheet

(56) References Cited

U.S. PATENT DOCUMENTS

| | | |
|---|---|---|
| 5,810,826 A * | 9/1998 | Åkerfeldt et al. ............... 606/80 |
| 5,908,477 A | 6/1999 | Harmer et al. |
| 5,947,659 A * | 9/1999 | Mays ........................... 408/211 |
| 6,309,149 B1 | 10/2001 | Borschert et al. |
| 7,018,144 B2 * | 3/2006 | Sasagawa et al. ............. 408/230 |
| 7,147,411 B2 * | 12/2006 | Astakhov et al. ............... 408/59 |
| 7,686,105 B2 * | 3/2010 | Hata ........................... 175/394 |
| 8,292,555 B2 * | 10/2012 | Shaffer ........................ 408/230 |
| 2010/0124466 A1 * | 5/2010 | Men ............................. 408/144 |

FOREIGN PATENT DOCUMENTS

| | | | | |
|---|---|---|---|---|
| EP | 0991489 | A1 | 4/2000 | |
| JP | 61062091 | A | 3/1986 | |
| JP | 07314229 | A | 12/1995 | |
| JP | 2007283473 | A * | 11/2007 | ............. B23B 51/00 |
| JP | 2007314230 | A | 12/2007 | |
| RU | 2130362 | C1 | 5/1999 | |
| SU | 469545 | A1 | 5/1975 | |
| SU | 1207648 | A | 1/1986 | |

* cited by examiner

DRILLING TOOL AND METHOD FOR DRILLING

BACKGROUND OF THE INVENTION

1. Field of the Invention

The invention relates to a drilling tool which extends in the longitudinal direction and has a drill point and a first and a second main cutting edge which extend outward. The invention also relates to a method for drilling using such a drilling tool.

2. Description of the Prior Art

Such a drilling tool can be seen, for example, from EP 0 991 489 B1. The drilling tool described therein is a twist drill for dry drilling. During dry drilling, the problem occurs that, on account of a lack of cooling, the drill expands in the cutting head region due to the generation of heat, a factor which leads to high loads occurring at the guide chamfers when the drill is withdrawn from the drill hole.

In order to avoid these high loads, an asymmetrical configuration of a chisel edge is provided in the twist drill according to EP 0 991 489 B1. On account of the asymmetrical configuration, the drill cuts a drill hole which has an enlarged hole diameter compared with the outside diameter of the twist drill. Despite the expansion in the region of the drill cutting edges which is caused by heat, the drill can therefore be taken out of the drill hole again without any problems.

For a specific field of application, namely the drilling of holes in printed circuit boards formed from synthetic resin, a special drill can be seen from DE 26 55 452 A. Said special drill also has an asymmetrical configuration of the drill head in the region of the cutting edges in order to enlarge the drill hole. This is optionally achieved by the cutting edges being designed with different lengths or by said cutting edges being arranged at different point angles. The particular problem which arises during the drilling of printed circuit boards, namely that drill dust is produced which can be pressed against the wall of the drill hole, is thereby taken into account. Due to the asymmetrical configuration, a drill hole larger than the outside diameter of the drill is produced, such that the drill is at a distance from the wall of the drill hole on one longitudinal side.

In contrast thereto, however, in the normal case highly symmetrical configurations are desired in drills, such that concentric running of the highest possible precision and high-precision drilling are achieved. Here, asymmetry may perhaps occur only as grinding errors. In contrast, the drills described above use the asymmetry specifically to avoid problems in special applications. With the asymmetrical configuration, however, asymmetrical loading and thus increased wear of the drilling tool also occur, as a result of which the service life is reduced. This applies in particular to drills such as carbide drills or drills having cutting inserts made of a special cutting material which are intended for machining high-strength materials, for example steels.

On account of the asymmetrical configuration, the drill is particularly pressed on one side against the wall of the drill hole during the drilling operation. A guide chamfer is normally provided circumferentially on the "land". The drill bears with this guide chamfer against the wall of the drill hole. In conventional drilling tools having a highly symmetrical configuration, the two guide chamfers in a double-edged drill bear diametrically opposite one another in each case against the wall of the drill hole and are uniformly loaded. Due to the asymmetrical configuration, one of the two guide chamfers is now loaded to an excessive degree, such that the wear thereof is markedly higher. In addition, the risk of parts of the guide chamfer chipping in the event of caking of chip parts on the wall of the drill hole is greater.

The object of the invention is to specify a drilling tool which has asymmetrical configurations and high wear resistance.

SUMMARY OF THE INVENTION

The object is achieved according to the invention by a drilling tool which extends in the longitudinal direction and has a drill point and a first and a second main cutting edge. The two main cutting edges extend approximately radially outward. The drill point is arranged eccentrically with respect to a center axis, which at the same time forms the rotation axis. At the same time, the second main cutting edge is arranged at a higher level than the first main cutting edge by a cutting height difference. In addition, the first main cutting edge has a shorter radial cutting edge length than the second main cutting edge.

The expression "drilling tool" generally refers to a tool which is used for drilling and comprises at least the cutting or drill head. The drilling tool can therefore be merely a drill head which is fastened to a drill body or a shank and a complete drill with drill head, drill body and shank.

The expression "radial cutting edge length" refers in this case to the radial distance between that end of the main cutting edge which faces the drill point and the outer circumference of the drilling tool.

The expression "cutting height difference" refers to an arrangement of the two main cutting edges in which they differ in their position relative to the longitudinal direction. Therefore, as viewed in the longitudinal direction from a drill shank to the drill point, the second main cutting edge is arranged further forward than the first main cutting edge. The definition "situated at a higher level" or "arranged further forward" relates here in each case to in particular two comparison points of the two main cutting edges which have the same radial distance from the rotation axis and thus from the center axis. The definition of the cutting height difference is also obtained in particular from DIN 6540, Part 1 and Part 2, issue April 93. The arrangement of the two main cutting edges at different cutting heights means in particular that the radially outer ends of the main cutting edges are offset from one another in the longitudinal direction.

Due to the eccentric arrangement of the drill point, which the longer radial cutting edge length follows, a drill hole which has a larger drill hole diameter compared with the drill nominal diameter is produced during the drilling. A first radial force component is produced by this first asymmetry feature. In a complementary manner, the shorter second main cutting edge is arranged higher by the cutting height difference. A second radial force component is produced by this second asymmetry feature, and this second radial force component counteracts the first radial force component, such that the asymmetrical loading of the drill is reduced. In this case, the second main cutting edge situated at a higher level is a "leading cutting edge" with respect to a defined drilling/rotation direction.

The configuration of the drilling tool described here combines two asymmetry features, which are actually normally regarded as grinding errors, in such a way that the asymmetrical loads on the drill which are in each case caused by the asymmetry features counteract one another and thus compensate one another. The contact pressure, produced by the first radial force component, against the wall of the drill hole is therefore at least reduced by the specially selected combination. As a result, the loading of the drill, in particular of a first guide chamfer which is assigned to the first main cutting edge and runs along the wall of the drill hole, is markedly reduced.

Such a drilling tool serves to machine hard materials, in particular steels, and is suitable in particular as a dry drill and in addition also for drilling special materials which have a certain elastic behavior. Thus the machining, for example, of high-grade steel leads in the case of drilling to the drilled hole contracting and narrowing slightly immediately after the drilling. The result of this is that, when a conventional drill is used, said drill can become jammed in the drill hole.

With the configuration described here, firstly, on account of the first asymmetry feature, an enlarged drill hole is advantageously produced, such that jamming is avoided. Secondly, due to the second asymmetry feature, the loading in particular of the first guide chamfer is reduced and thus a longer service life is achieved.

Firstly the cutting height difference and secondly the eccentric arrangement and also the longer first main cutting edge are expediently selected in such a way that the radial force components largely and preferably completely compensate one another during the drilling operation. Thus a largely and preferably completely symmetrical radial action of force on the drilling tool is achieved, such that uniform loading overall is obtained. In order to achieve this, a feed of the drilling tool is expediently set during the drilling process in such a way that the chip volume removed by the first main cutting edge and the chip volume removed by the second main cutting edge are at least largely identical. The approximately identical radial force components are produced in this way.

In this case, the cutting height difference is expediently within the range of between 0.03 and 0.07 mm. The cutting height difference is therefore preferably greater than the admissible tolerance value for a cutting height difference according to DIN 6540, Part 1. The cutting height difference is measured in particular according to the method as described in DIN 6540, Part 2, issue April 93. Instead of the term "cutting height difference", the term "axial run-out" is also partly used. The latter indicates by how much the two main cutting edges normally arranged opposite one another are offset from one another in the drill longitudinal direction during a 180° rotation.

According to an expedient development, the offset between the center axis and the drill point is greater than 0.02 mm and is in particular within the range of between 0.02 mm and about 0.06 mm. Thus the offset is also within a range greater than the normally permissible tolerance value for the axial run-out, as is obtained, for example, from DIN 6540, Part 1 and as is measured according to DIN 6540, Part 2.

According to an expedient development, the two main cutting edges are arranged at an identical partial point angle relative to the drill point. Apart from the cutting height difference and their different length, the two main cutting edges are therefore of identical design. The point angle formed by the two main cutting edges, for example in a conventional twist drill, is normally about 135°. An obtuse point angle is therefore normally provided. Alternatively, the two main cutting edges can also be arranged relative to one another at a 180° angle, that is to say they run parallel to one another, as is the case, for example, in a step drill.

The two main cutting edges are expediently directly connected to one another via a chisel edge crossing the drill point, such that a cutting edge formed from main cutting edges and a chisel edge extends continuously over the drill center.

Alternatively, the drilling tool is designed as a step drill in which the main cutting edges are set back relative to the drill point. In a step drill, a first cutting edge pair is normally arranged at the front drill point. The second cutting edge pair is then set back in the drill longitudinal direction, with a step being formed, said second cutting edge pair forming in the present case the two main cutting edges which have the cutting height difference relative to one another.

The drilling tool is preferably designed as a twist drill in which secondary cutting edges adjoin the main cutting edges at a respective cutting corner and run along flutes in the longitudinal direction.

The object is furthermore achieved according to the invention by a method of producing a drill hole using such a drilling tool. Provision is expediently made here for a feed to be set in such a way that the chip volumes removed by the first and the second main cutting edges are at least largely identical. The feed is therefore in particular greater than the cutting height difference.

A drilling tool having two main cutting edges rotationally offset approximately by 180° is preferably provided. Alternatively, drilling tools having more than two main cutting edges, for example three main cutting edges, can also be used. The same observations with regard to the compensation of the radial force components produced by the individual cutting edges then apply to such drilling tools having more than two main cutting edges.

BRIEF DESCRIPTION OF THE DRAWINGS

Exemplary embodiments of the invention are explained in more detail below with reference to the drawing, in which, in each case in schematic and highly simplified illustrations.

DETAILED DESCRIPTION OF THE INVENTION

Figure 1:
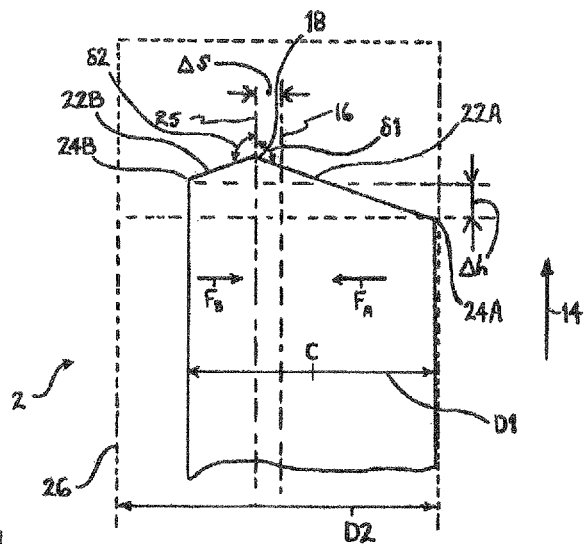
FIG. 1 shows a cross section through a drill head.
Figure 2:
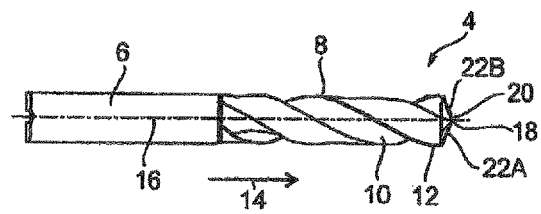
FIG. 2 shows a twist drill in a side view.

FIG. 1 shows in a highly simplified illustration a drill head 2, for example of a twist drill 4, as shown in FIG. 2. The twist drill 4 has a shank 6 with which the drill 4 is chucked in place in a machine mounting. Adjoining the shank 6 is the drill body 8, on the front end of which the drill head 2 is formed. In the exemplary embodiment, said drill head 2 is connected to the drill body 8 in one piece. Alternatively, the drill head 2 can also be connected to the drill body 8 as a separate construction unit in a non-detachable or detachable manner. In the twist drill 4, helically running flutes 10 are fashioned in the drill body 8, each flute 10 being defined at one of its marginal sides by a secondary cutting edge 12. The circumferential region between two flutes 10 is designated as the land. A guide chamfer is normally formed on that end of the land which is remote from the respective secondary cutting edge 12. The twist drill 4 extends as an entity in the longitudinal direction 14 and has a center axis 16, which is at the same time the rotation axis about which the drill 4 rotates when it is chucked in the machine mounting and is in operation.

The drill 4 has a drill point 18 at its front end as viewed in longitudinal direction 14. In a twist drill as shown in FIG. 2, the drill point 18 is part of a chisel edge 20 which extends over the "drill core". A first main cutting edge 22A and a second main cutting edge 22B follow on both sides of the chisel edge 20.

The special configuration of the drill head 2 in the region of the drill point 18 can be seen with reference to FIG. 1. As can be seen therefrom, the drill point 18 is arranged at a distance from the center axis 16 by an offset $\Delta s$. At the same time, the first main cutting edge 22A is arranged deeper than the second main cutting edge 22B by a cutting height difference $\Delta h$. In the present case, the expression "cutting height difference"

refers to the difference between the radially situated cutting corners 24A, 24B of the two main cutting edges 22A, 223 with respect to the longitudinal direction 14.

With respect to an imaginary point axis 25 which passes through the drill point 18, the two main cutting edges 22A, 22B are each arranged at an identical partial point angle $\delta 1$ and $\delta 2$ of 66.5° in the exemplary embodiment, such that the conventional point angle of 135° is obtained.

The offset $\Delta s$ and the longer first main cutting edge 22A provide for a center axis 16 to be offset with respect to the center C of the nominal diameter D1 of the drill head 2. These features first of all ensure that a drill hole 26 which is indicated by a dot-dash line in FIG. 1 has an enlarged hole diameter D2 compared with a drill nominal diameter D1. As seen in FIG. 1, the first main cutting edge 22A and the second main cutting edge 22B each extend from the drill point 18 outwardly to the perimeter of the drill head 2. At the same time, a first radial force component $F_A$ is produced by this asymmetry. The second main cutting edge 22B, due to the fact that it is situated at a higher level, engages deeper in the workpiece to be machined than the first main cutting edge 22A during the cutting operation, such that a second radial force component $F_B$ is produced which counteracts the first radial force component $F_A$. The two force components $F_A$, $F_B$ are now selected in such a way that they at least largely and preferably completely compensate one another; that is to say that there is preferably no resulting radial action of force on the drill 4 in the region of the drill head 2. Overall, therefore, the cutting height difference $\Delta h$ and the offset $\Delta s$ are matched to one another with regard to a specific feed during the drilling operation in such a way that the force components $F_A$, $F_B$ compensate one another. The expression "feed" generally refers to the forced length of travel of the drill 4 in the longitudinal direction 14 during a 360° rotation.

Figure 3:
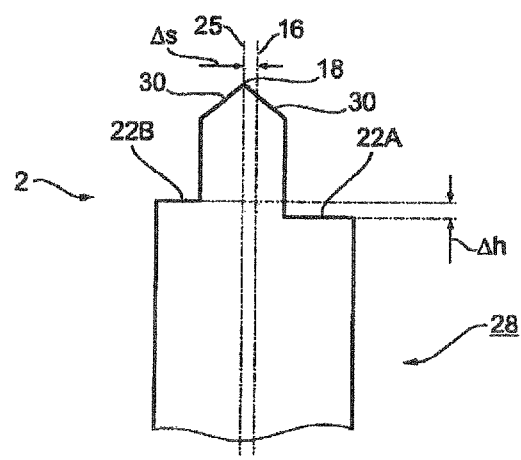
FIG. 3 shows a cross section through a step drill.

The observations made with respect to FIG. 1 can also be applied to drill heads 2 having interchangeable cutting bodies, such as indexable inserts for example. Equally, the observations made can also be applied to a step drill 28, as shown highly simplified in FIG. 3 for example. In the step drill 28, the drill point 18 is arranged at a distance from the main cutting edges 22A, 22B. In the exemplary embodiment, the latter run perpendicularly to the center axis 16. Further main cutting edges 30 are arranged in the region of the drill point 18. In the step drill 28, too, the two main cutting edges 22A, 22B have the cutting height difference $\Delta h$. At the same time, the drill point 18 is arranged offset from the center axis 16 by an offset $\Delta s$.

The drilling tool described here is distinguished by the fact that two asymmetry features of the drill head 2, which are normally regarded as grinding errors, are deliberately combined with one another in such a way that the radial force components $F_A$, $F_B$ at least largely compensate one another, such that that asymmetrical wear normally caused by an asymmetrical design is at least reduced.

The invention claimed is:

1. A drilling tool which extends in the longitudinal direction and has a drill head with a nominal diameter defining a perimeter, a drill point and a first and a second main cutting edge which extend from the drill point outwardly to the perimeter of the drill head and secondary cutting edges extending in the longitudinal direction with lands therebetween, wherein the drill point is located at an offset with respect to a center axis of the drilling tool, which is also the rotation axis of the drilling tool, and wherein the center axis of the drilling tool is offset with respect to the center of the nominal diameter of the drill head and in that the second main cutting edge—with respect to the longitudinal direction toward the drill point—is arranged at a higher level by a cutting height difference and at the same time has a shorter radial cutting edge length than the first main cutting edge and wherein during the drilling operation, a first radial force component is produced by the eccentric arrangement of the drill point and by the longer first main cutting edge and a second radial force component is produced by the higher arrangement of the second main cutting edge, and the offset and the cutting height difference are selected such that said radial force components at least largely and completely compensate one another; and wherein guide chamfers are formed only on the end of the lands remote from each of the secondary cutting edges.

2. The drilling tool as claimed in claim 1, wherein the cutting height difference is within the range of between 0.03 and 0.07 mm.

3. The drilling tool as claimed in claim 1, wherein the two main cutting edges are arranged at the same partial point angle relative to the drill point.

4. The drilling tool as claimed in claim 1, wherein the two main cutting edges are connected to one another via a chisel edge crossing the drill point.

5. The drilling tool as claimed in claim 1, wherein it is designed as a step drill and the main cutting edges are set back relative to the drill point.

6. The drilling tool as claimed in claim 1, wherein it is designed as a twist drill having secondary cutting edges which adjoin the main cutting edges and run along flutes in the longitudinal direction.

7. A method of producing a drill hole using a drilling tool as claimed in claim 1.

8. The method as claimed in claim 7, in which a feed of the drilling tool is set in such a way that a chip volume removed by the first main cutting edge and a chip volume removed by the second main cutting edge are at least largely identical.

9. The drilling tool as claimed in claim 1, wherein the offset is within the range of between 0.02 mm and 0.06 mm.

* * * * *